(12) United States Patent
Fallowes

(10) Patent No.: US 6,932,503 B2
(45) Date of Patent: Aug. 23, 2005

(54) FOOD SCRAPER ATTACHMENT FOR FOOD MIXER

(75) Inventor: Gary Fallowes, 5949 Dirac St., San Diego, CA (US) 92122

(73) Assignee: Gary Fallowes, San Diego, CA (US)

( * ) Notice: Subject to any disclaimer, the term of this patent is extended or adjusted under 35 U.S.C. 154(b) by 129 days.

(21) Appl. No.: 10/449,971

(22) Filed: May 30, 2003

(65) Prior Publication Data

US 2004/0240313 A1 Dec. 2, 2004

(51) Int. Cl.[7] .................................................. B01F 15/00
(52) U.S. Cl. .................................................... 366/309
(58) Field of Search ................................ 366/309, 310, 366/311, 312, 313, 129; 99/348; D7/376, 379, 380

(56) References Cited

U.S. PATENT DOCUMENTS

| | | | |
|---|---|---|---|
| 1,415,735 A | * 5/1922 | Trust et al. ................ | 366/309 |
| 1,674,903 A | 6/1928 | Johnston et al. | |
| 1,872,004 A | 8/1932 | Rataiczak et al. | |
| 2,258,830 A | * 10/1941 | Vollrath ..................... | 366/309 |
| 2,306,245 A | * 12/1942 | Duke ......................... | 366/309 |
| 2,562,790 A | 7/1951 | Houston, Jr. | |
| 2,651,582 A | 9/1953 | Courtney ................... | 106/167 |
| 2,753,160 A | * 7/1956 | Gunn, Sr. .................. | 366/343 |
| 3,187,366 A | 6/1965 | Fant .......................... | 15/246 |
| 3,415,497 A | 12/1968 | Johnson | |
| 3,490,751 A | * 1/1970 | Thomson ................... | 366/309 |
| 4,190,371 A | * 2/1980 | Durr et al. ................. | 366/139 |
| 4,854,717 A | 8/1989 | Crane et al. ............... | 366/197 |
| 4,900,160 A | 2/1990 | Brooks et al. ............. | 366/347 |
| 4,946,285 A | 8/1990 | Vennemeyer .............. | 366/288 |
| 5,556,201 A | 9/1996 | Veltrop et al. ............. | 366/203 |
| 5,791,777 A | 8/1998 | Mak .......................... | 366/129 |

* cited by examiner

Primary Examiner—Tony G. Soohoo
(74) Attorney, Agent, or Firm—John L. Rogitz

(57) ABSTRACT

A food scraper for a food mixer is releasably engaged around a beater shaft of the food mixer that releasably engages a mixing attachment. The food scraper has an arm that extends away from the mixing attachment and that is closely spaced or that contacts the mixing bowl to scrape food from the side of the bowl back into the mixing volume as the food mixer mixes the food.

16 Claims, 2 Drawing Sheets

FOOD SCRAPER ATTACHMENT FOR FOOD MIXER

I. FIELD OF THE INVENTION

The present invention relates generally to food mixers.

II. BACKGROUND OF THE INVENTION

Food mixers are present in most kitchens. Many food mixers include a revolving planetary element that has a rotating beater shaft with which an attachment such as a wire whisk can be engaged, with the attachment revolving with the planetary element as well as rotating with the shaft. As the planetary element revolves and the attachment rotates, the attachment moves through food constituents in a bowl placed under the planetary element to mix, beat, or otherwise process the food constituents.

As recognized by the present invention, during the mixing process it is common for some of the food to stick to the side of the bowl and remain there. This requires that the cook stop the food mixer and scrape food from the side of the bowl back into the mixing region. This is inconvenient.

To the extent that attachments for food mixers have been provided to automatically scrape food from the side of a bowl, they typically suffer from the drawback of requiring a person to screw the attachment into a portion of the food mixer. This also is inconvenient, because it requires a person who may be unfamiliar with fasteners and screwdrivers to undertake installation, and moreover because it requires a modification to the food mixer, specifically, the provision of additional fastener receptacles in the food mixer.

Having made the critical recognitions above, the invention below is provided.

SUMMARY OF THE INVENTION

A bowl scraper attachment is disclosed for a food mixer that has a revolvable planetary element and a rotatable beater shaft that can engage a mixing attachment. The mixing attachment in turn includes an upper shoulder. The mixing attachment releasably engages the beater shaft that depends down from the planetary element such that the mixing attachment can rotate in a container engaged with the food mixer when the planetary element revolves. The bowl scraper includes an arm and an engagement member on a first end of the arm and having structure for releasably engaging the food mixer and/or the mixing attachment between the shoulder of the mixing attachment and the planetary element. A scraper element is on a second end of the arm and is configured for scraping the container bowl as the arm moves.

With the preferred arrangement set forth further below, the engagement member of the food scraper revolves with the planetary element such that no relative translational motion occurs between the engagement member and planetary element when the planetary element revolves. The mixing attachment remains free to rotate with the beater shaft, however, because the engagement member of the food scraper surrounds the shaft and rides on the shoulder of the mixing attachment when the planetary element revolves.

In an exemplary non-limiting implementation, the engagement member may include a bracket and a gate hingedly attached to the bracket and movable between an open configuration, wherein the beater shaft may be moved into and out of the bracket, and a closed configuration, wherein the shaft is constrained within the bracket and gate. To hold the engagement member closed, a male nipple on one of the hinged components engages a female socket on the other of the hinged components. Furthermore, to strengthen the engagement member when the food scraper is pulled through the food in the container, the gate (or the bracket) may include protruding strengthening lands and the bracket (or gate) may include cavities for closely receiving the strengthening lands.

In another aspect, a system includes a food mixer, a mixing attachment releasably engageable with the food mixer to establish a food processing assembly, and a bowl scraper that is releasably engageable with the food processing assembly between the mixing member of the mixing attachment and the food mixer for rotating within a container positioned around the mixing member to scrape the side of the container during mixing.

In still another aspect, a method for mixing ingredients includes engaging a mixing attachment with a food mixer with the mixing attachment depending down from the food mixer into a container of ingredients. The method also includes releasably engaging a food scraper around a connecting beater shaft. The food scraper revolves when the food mixer is activated to scrape ingredients from the side of the container.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
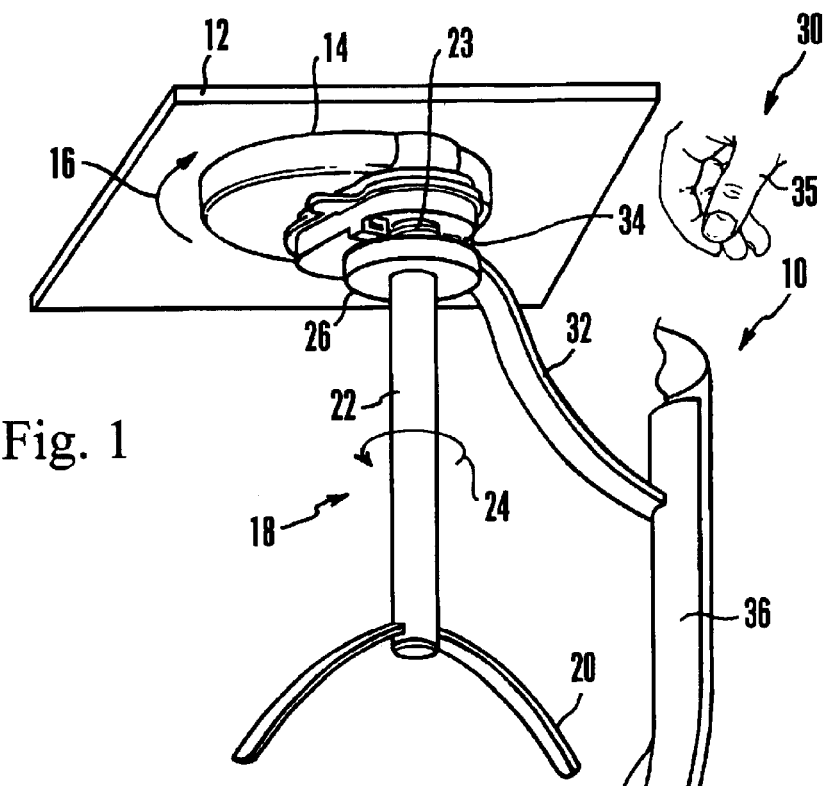
FIG. 1 is a perspective view of the food scraper engaged with a food mixer, with portions of the food mixer and bowl broken away for clarity.

Referring initially to FIG. 1, a system is shown, generally designated 10, that includes a food mixer 12 that has a revolving generally disk-shaped planetary element 14 which revolves as indicated by the arrow 16 when the food mixer 12 is activated. A mixing attachment 18 such as a flat beater, mixer, wire whisk, etc. has a mixing member 20 and a shaft 22 extending away from the mixing member 20 and terminating in the below-mentioned shoulder. The mixing attachment 18 may be engaged with a beater shaft 23 that depends down from the planetary element 14 and that rotates relative to the element 14 in accordance with food mixer principles known in the art. The beater shaft 23 is spaced from the axis of revolution of the planetary element 14 so that the mixing attachment 18 not only rotates about its own shaft as indicated by the arrow 24, but also moves translationally in a circle as the planetary element 14 revolves. The mixing attachment 18 can have an upper shoulder 26 into which the beater shaft 23 extends to releasably engage the planetary element 14 with the shoulder 26. The mixing attachment 18 moves in bowl or other container 28 into which food constituents can be placed for processing.

In accordance with the present invention, a food scraper 30 is releasably engaged with the above structure without the need for fasteners or for modifications (e.g., the forming of special fastener holes) to an off-the-shelf food mixer 12.

More specifically, the food scraper 30 includes an elongated arm 32 that can be gently curved as shown, and an engagement member 34 on the top end of the arm 32 has structure as set forth more fully below that releasably engages the beater shaft 23 above the shoulder 26 of the mixing attachment 18. The preferred arm 32 is contoured as shown, i.e., with the upper portion of the arm closer to vertical than horizontal and the lower portion closer to horizontal than vertical when the food scraper 30 is engaged with the food mixer 12 as shown, to allow clearance for the hand 35 of a cook to safely add ingredients during operation.

A scraper element 36 is on the bottom end of the arm 32 and is configured for scraping the side of the container 28 as the arm 32 moves. In the embodiment shown, the scraper element is blade-shaped and is slightly convex near its bottom end to conform to the shape of the container 28. The length and configuration of the arm 32 is established so that the scraper element 36 is closely spaced from the side wall of the container 28. By "closely spaced from" is meant that the scraper element may slightly touch the container 28 or be so close to it that it effectively scrapes food from the container and directs it back toward the mixing member 20. The scraper element 36 may be cocked slightly in the direction of rotation, to facilitate pushing food into the middle of the container. A scoop may be added along the trailing edge of the scraping element to also help direct the food inward.

The preferred non-limiting scraper element 36 is made of an elastomeric material that is appropriate for food processing. For example, the scraper element 36 may be made of molded plastic and then overmolded with urethane. Such a material advantageously avoids unduly scratching or otherwise damaging the container 28.

In any case, when engaged as intended with the food mixer 12, the scraper element 36 preferably is positioned about 90° ahead or behind the mixing attachment 18. In this way, the arm 32 and remaining structure of the scraper 30 avoids interfering with the mixing attachment 18 and with a cook adding ingredients to the container during operation.

Figure 2:
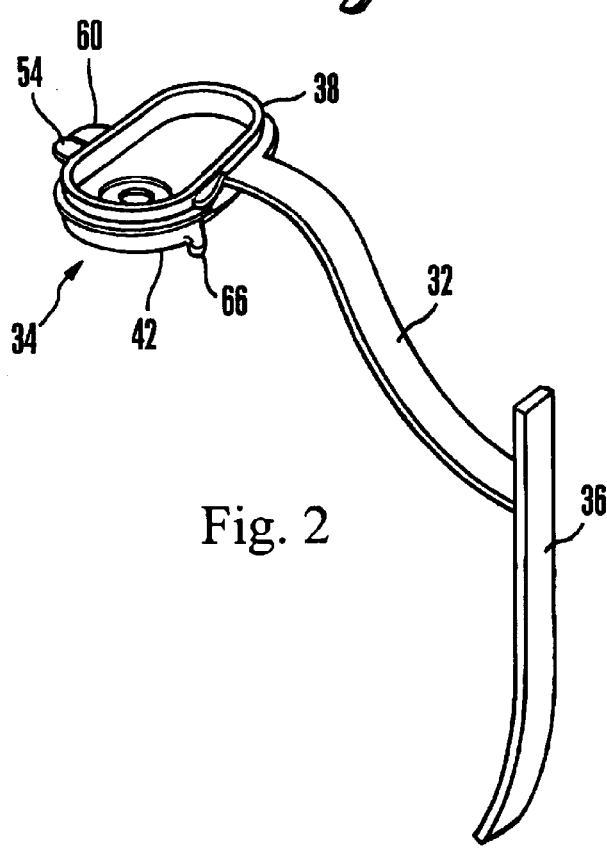
FIG. 2 is a perspective view of the food scraper in the closed configuration.
Figure 3:
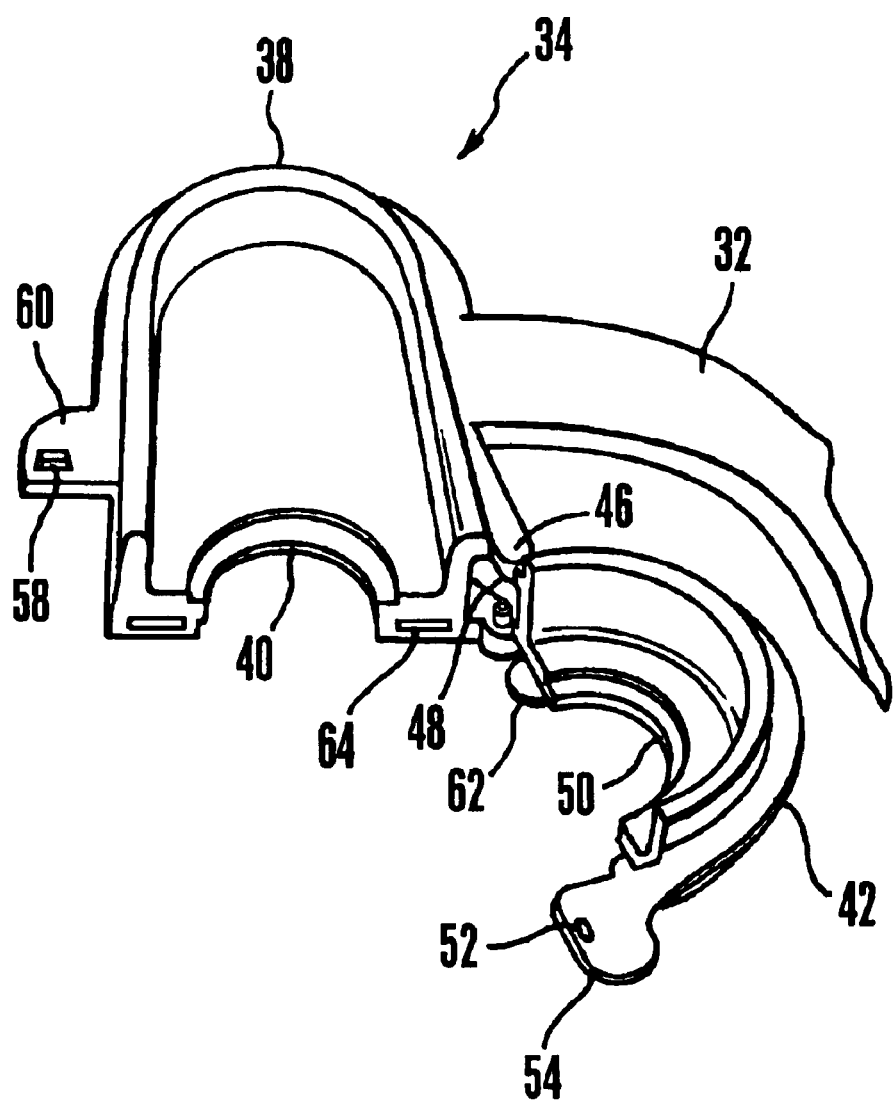
FIG. 3 is a perspective view of the food scraper in the open configuration, with portions of the arm broken away.

The details of the food scraper 30 can be best appreciated in reference to FIGS. 2 and 3. As shown in cross-reference to FIGS. 2 and 3, the exemplary non-limiting engagement member 34 can include a bracket 38 defining a generally semi-circular or U-shaped cavity 40 that is sized for receiving the beater shaft 23 of the food mixer 12. The bracket 38 may be made of a single piece of injection molded plastic. A gate 42 is hingedly attached to the bracket 38 by means of a pivot pin 46 that is received through respective eyes 48 of the bracket 38 and gate 42. The gate 42 may also define a semi-circular or U-shaped cavity 50.

As can be appreciated looking at FIGS. 2 and 3, the gate 42 is movable between an open configuration (FIG. 3), wherein the beater shaft 23 of the food mixer may be moved into and out of the bracket 38, and a closed configuration (FIG. 2), wherein the shaft is radially constrained within the contiguous cavities 40, 50 of the bracket 38 and gate 42.

To hold the engagement member 34 in the closed configuration, one of the bracket and gate may be formed with a male nipple and the other of the bracket and the gate may be formed with a female socket for receiving the male nipple in an interference or snapping fit to hold the engagement member in the closed configuration. In the particular embodiment shown, a male nipple 52 is formed on an extension 54 of the gate 42, and a socket 58 for releasably receiving the nipple 52 is formed in an extension 60 of the bracket 38.

It is to be understood that other structure for facilitating easy and quick engagement and disengagement of the food scraper 30 may be used. For example, instead of a nipple and socket, two magnets may be mounted on the extensions 54, 60 to magnetically engage each other to hold the engagement member 34 in the closed configuration. Or, no gate 42 need be provided at all. Instead, a magnet can be provided on the bracket 38 and another magnet can be provided on the shoulder of the mixing attachment 18 to hold the bracket onto the mixing attachment.

To strengthen the engagement member 34 to withstand torque while being moved through food constituents, the gate and the bracket can include strengthening structure. In the particular embodiment shown, on opposite sides of the cavity 50 the gate 42 includes respective protruding strengthening lands 62, while on opposite sides of its cavity 40 the bracket 38 includes respective cavities 64 for closely slidably receiving the strengthening lands 62 when the gate 42 is closed.

In addition to the above structure, the engagement member 34 may also be formed with elements for riding on the collar 26 of the mixing attachment 18. In the non-limiting exemplary embodiment shown in FIG. 2, small cylindrical legs 66 (only a single leg 66 shown in FIG. 2) may depend downwardly from the gate 42 and/or bracket 38.

With the above structure, the engagement member 34 can be moved by hand to the open configuration shown in FIG. 3 and placed around the beater shaft 23 of the food mixer 12 between the collar 26 of the mixing attachment 18 and the planetary element 14 of the food mixer 12, with the legs 66 of the engagement member 34 resting on the collar 26. The gate 42 can then be closed by hand around the beater shaft 23 until the nipple 52 engages the socket 58 to hold the engagement member 34 in the closed configuration shown in FIGS. 1 and 2. The contiguous cavities 40, 50 of the gate 42/bracket 38 form a circular opening that is larger than the diameter of the food mixer beater shaft 23, such that when the food mixer is activated, the beater shaft 23 turns freely within the engagement member 34, with the legs 66 riding on the collar 26. Recall, however, that the beater shaft 23 (and the mixing attachment) revolve with the planetary element 14. Accordingly, the engagement member 34 (and, hence, food scraper 30) revolves with the planetary element 14 such that no relative translational motion occurs between the engagement member 34 and planetary element 14 when the planetary element 14 revolves.

The invention provides the above-described capabilities in an inexpensive and durable attachment that is capable of extended duty cycles and that is easily maintained.

While the particular FOOD SCRAPER ATTACHMENT FOR FOOD MIXER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings unless the meanings cannot be reconciled with the present specification and file history.

What is claimed is:

1. A bowl scraper attachment for a food mixer having a revolvable planetary element and a rotatable mixing attachment having an upper shoulder, a beater shalt extending from the planetary clement to the shoulder, the mixing attachment releasably engaging the beater shall such that the mixing attachment can rotate in a container engaged with the food mixer when the planetary element revolves, comprising:
   an arm;
   an engagement member on a first end of the arm and having structure releasably engageable with at least one of: the food mixer, and the mixing attachment, between the shoulder of the mixing attachment and the planetary element; and
   a scraper element on a second end of the arm and configured for scraping the container bowl as the arm moves, wherein the engagement member surrounds the beater shaft of the food mixer and rides on the shoulder of the mixing attachment when the planetary element revolves, the beater shaft rotating relative to the engagement member.

2. The bowl scraper of claim 1, wherein the engagement member revolves with the planetary element such that no relative translational motion occurs between the engagement member and planetary element when the planetary element revolves.

3. The bowl scraper of claim 1, wherein the scraper element is overmolded with material to avoid scratching the container.

4. A bowl scraper attachment for a food mixer having a revolvable planetary element and a rotatable mixing attachment having an upper shoulder, a beater shaft extending from the planetary element to the shoulder, the mixing attachment releasably engaging the beater shaft such that the mixing attachment can rotate in a container engaged with the food mixer when the planetary element revolves, comprising:
   an arm;
   an engagement member on a first end of the arm and having structure releasably engageable with at least one of: the food mixer, and the mixing attachment, between the shoulder of the mixing attachment and the planetary element; and
   a scraper element on a second end of the arm and configured for scraping the container bowl as the arm moves, wherein the engagement member includes:
   a bracket and a gate hingedly attached to the bracket and movable between an open configuration, wherein the beater shaft of the food mixer may be moved into and out of the bracket, and a closed configuration, wherein the beater shaft is constrained within the bracket and gate.

5. The bowl scraper of claim 4, wherein one of: the gate, and the bracket, is formed with a male nipple and the other of: the bracket, and the gate, is formed with a female socket for receiving the male nipple in an interference fit to hold the engagement member in the closed configuration.

6. The bowl scraper of claim 5 wherein one of: the gate, and the bracket, includes at least one protruding strengthening land and the other of: the bracket, and the gate, includes a cavity for closely receiving the strengthening land.

7. The bowl scraper of claim 4, wherein one of: the gate, and the bracket, includes at least one protruding strengthening land and the other of: the bracket, and the gate, includes a cavity for closely receiving the strengthening land.

8. A system, comprising:
   a food mixer including a revolvable planetary element and a beater shaft;
   a mixing attachment releasably engageable with the beater shaft of the food mixer to establish a food processing assembly, the mixing attachment having a mixing member configured for mixing food, the mixing attachment rotating when the planetary element revolves; and
   a bowl scraper releasably engageable with the food processing assembly between the mixing member and the food mixer without using fasteners for rotating within a container positioned around the mixing member to scrape the side of the container during mixing, wherein the bowl scraper includes an engagement member including;
   a bracket and a gate hingedly attached to the bracket and movable between an open configuration, wherein the beater shaft may be moved into and out of the bracket, and a closed configuration, wherein the beater shaft is constrained within the bracket and gate.

9. The system of claim 8, wherein the engagement member moves with the planetary element such that no relative translational motion occurs between the engagement member and planetary element when the planetary element revolves.

10. The system of claim 9, wherein the engagement member surrounds the beater shaft of the food mixer and rides on the shoulder of the mixing attachment when the planetary element revolves, the beater shaft rotating relative to the engagement member.

11. The system of claim 9, wherein the bowl scraper includes a scraper element overmolded with material to avoid scratching the container.

12. The system of claim 8, wherein one of: the gate, and the bracket, is formed with a male nipple and the other of: the bracket, and the gate, is formed with a female socket for receiving the male nipple in an interference fit to hold the engagement member in the closed configuration.

13. The system of claim 12, wherein one of: the gate, and the bracket, includes at least one protruding strengthening land and the other of: the bracket, and the gate, includes a cavity for closely receiving the strengthening land.

14. The system of claim 8, wherein one of: the gate, and the bracket, includes at least one protruding strengthening land and the other of: the bracket, and the gate, includes a cavity for closely receiving the strengthening land.

15. A method for mixing ingredients, comprising the acts of:
engaging a mixing attachment with a food mixer, the mixing attachment depending down from the food mixer into a container of ingredients; and
releasably engaging a food scraper around a connecting beater shaft of the food mixer, the food scraper rotating when the food mixer is activated to scrape ingredients from the side of the container, wherein the food scraper includes an engagement member resting on the mixing attachment.

16. The method of claim 15, wherein the beater shaft rotates within the engagement member, the food scraper revolving with a planetary element of the food mixer.

* * * * *